United States Patent [19]

Sugiura

[11] Patent Number: 5,361,144
[45] Date of Patent: Nov. 1, 1994

[54] IMAGE PROCESSING APPARATUS AND METHOD
[75] Inventor: Susumu Sugiura, Atsugi, Japan
[73] Assignee: Canon Kabushiki Kaisha, Tokyo, Japan
[21] Appl. No.: 31,198
[22] Filed: Mar. 12, 1993

Related U.S. Application Data

[62] Division of Ser. No. 607,651, Oct. 31, 1990, Pat. No. 5,220,417.

[30] Foreign Application Priority Data

Oct. 31, 1989 [JP] Japan ............... 1-285894

[51] Int. Cl.⁵ ............................. H04N 1/46
[52] U.S. Cl. ........................ 358/500; 358/539
[58] Field of Search .............. 358/75, 80, 400, 426, 358/474, 443, 448, 500, 539; 379/53, 100; H04N 1/46

[56] References Cited

U.S. PATENT DOCUMENTS

| | | | |
|---|---|---|---|
| 4,654,484 | 3/1987 | Reiffel et al. | 379/53 |
| 4,723,129 | 2/1988 | Endo et al. | 346/1.1 |
| 4,739,397 | 4/1988 | Hayashi | 358/80 |
| 4,740,796 | 4/1988 | Endo et al. | 346/1.1 |
| 4,953,012 | 8/1990 | Abe | 358/75 |
| 4,953,013 | 8/1990 | Tsuji et al. | 358/75 |
| 5,220,417 | 6/1993 | Sugiura | 358/434 |

FOREIGN PATENT DOCUMENTS

| | | | |
|---|---|---|---|
| 60-80371A | 5/1985 | Japan | H04N 1/46 |
| 0225100A3 | 10/1987 | Japan | H04N 1/46 |
| 2143102 | 1/1985 | United Kingdom | H04N 1/40 |
| 2143702 | 2/1985 | United Kingdom | H04N 1/32 |

Primary Examiner—Stephen Brinich
Assistant Examiner—Jerome Grant, II
Attorney, Agent, or Firm—Fitzpatrick, Cella, Harper & Scinto

[57] ABSTRACT

Image processing apparatus and method perform a predetermined compression processing for an input original. A compression processing method or a receiver of compressed data is changed in accordance with a color/black-and-white status discrimination for the input original, or is set manually.

28 Claims, 17 Drawing Sheets

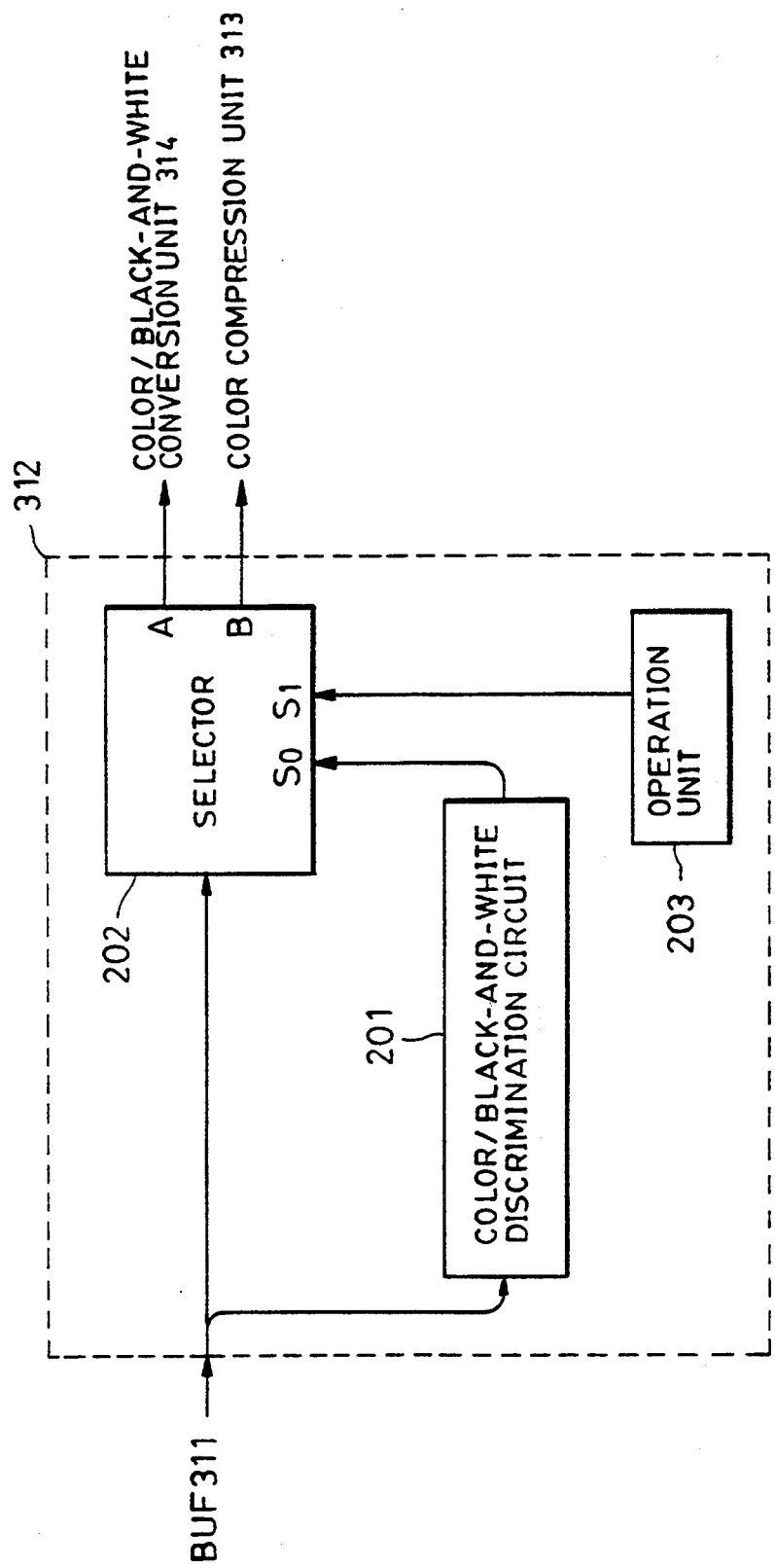

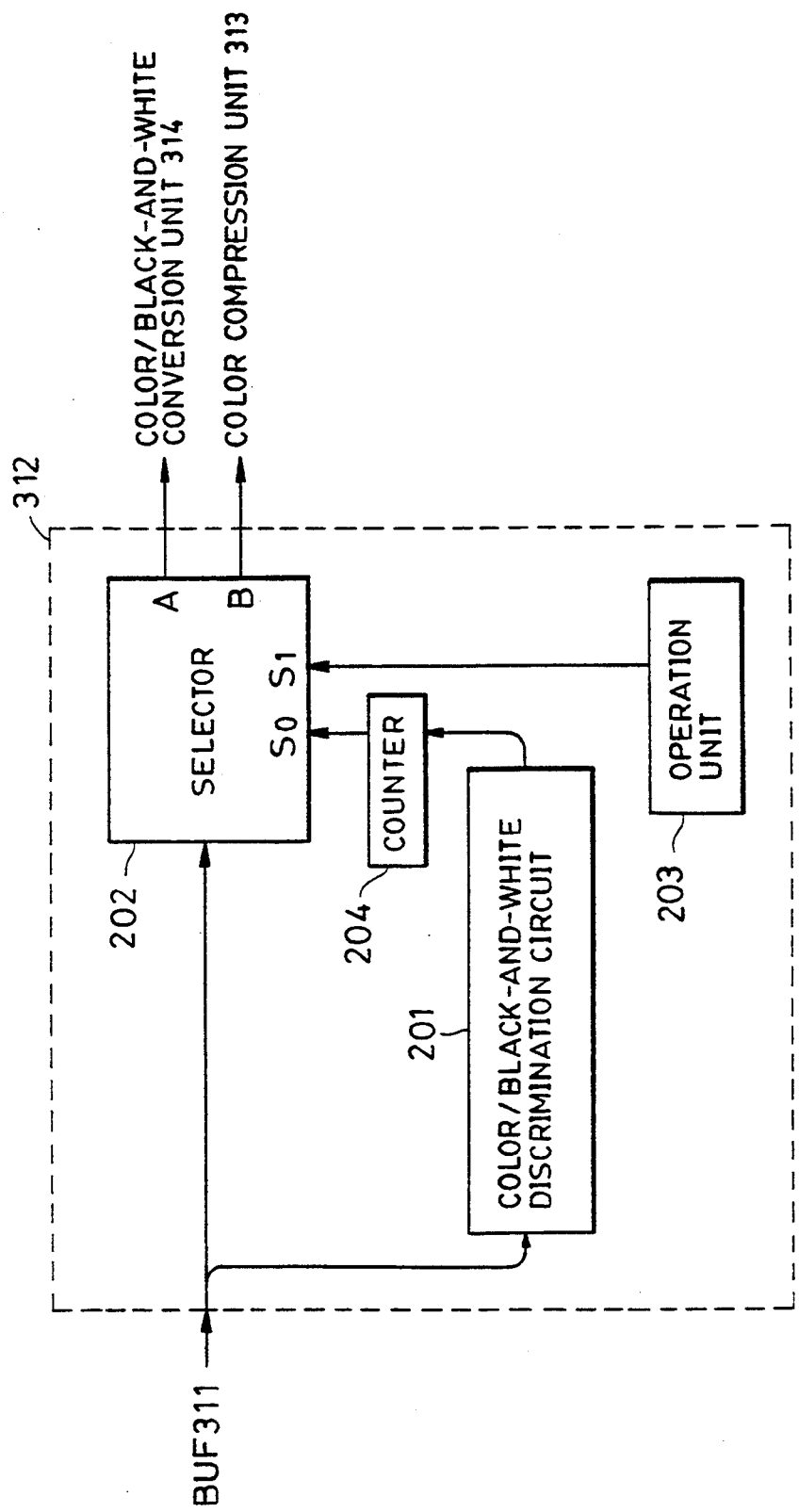

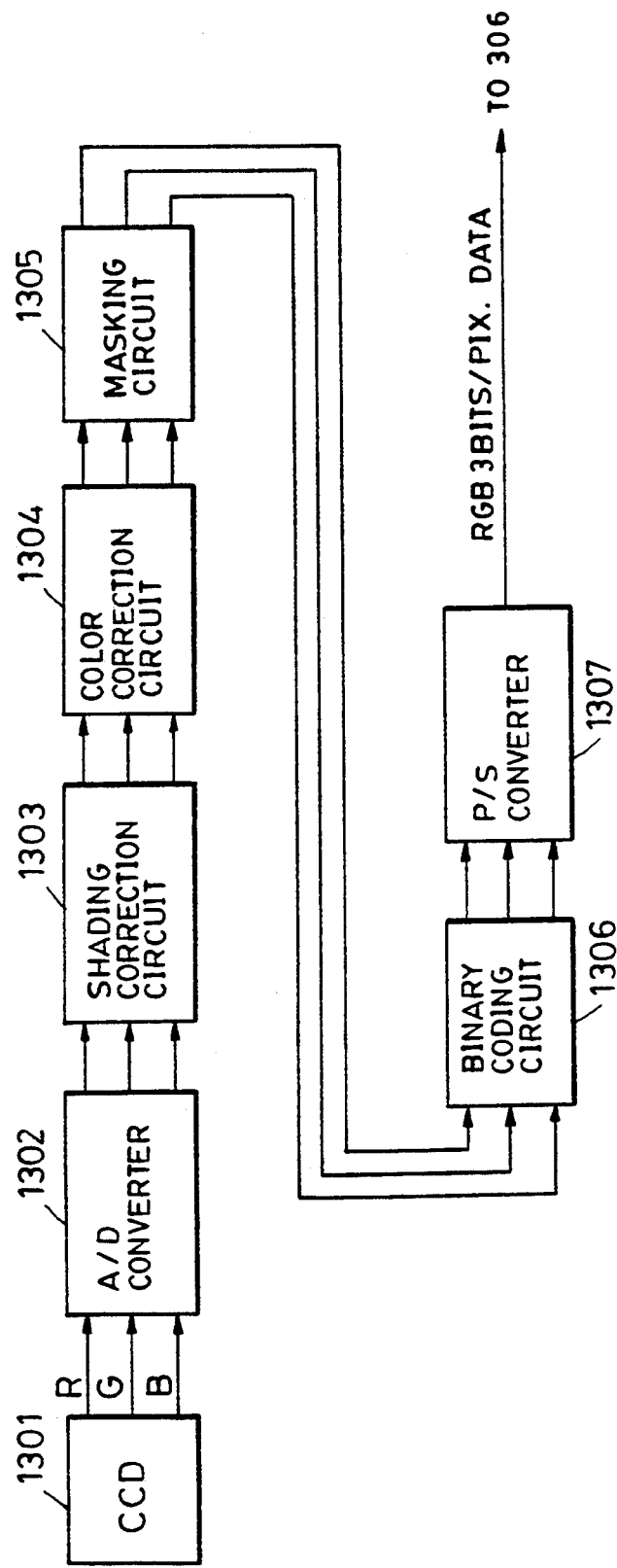

| L | S | (CONDITIONS) | H | |
|---|---|---|---|---|
| $\dfrac{max+min}{2}$ | $127 \cdot \dfrac{max-min}{So}$ WITH $So = \begin{cases} L & (L<128) \\ 255-L & (L \geq 128) \end{cases}$ | max=R, min=B | 43−Ho | WITH Ho = $\dfrac{43 \cdot (max-min)}{max-min}$ |
| | | max=R, min=G | 212+Ho | |
| | | max=G, min=R | 128−Ho | |
| | | max=G, min=B | 43+Ho | |
| | | max=B, min=G | 212−Ho | |
| | | max=B, min=R | 128+Ho | |

TABLE 1. RGB TO HLS TRANSFORM
(R.G.B.H.L.S = 8 BIT)

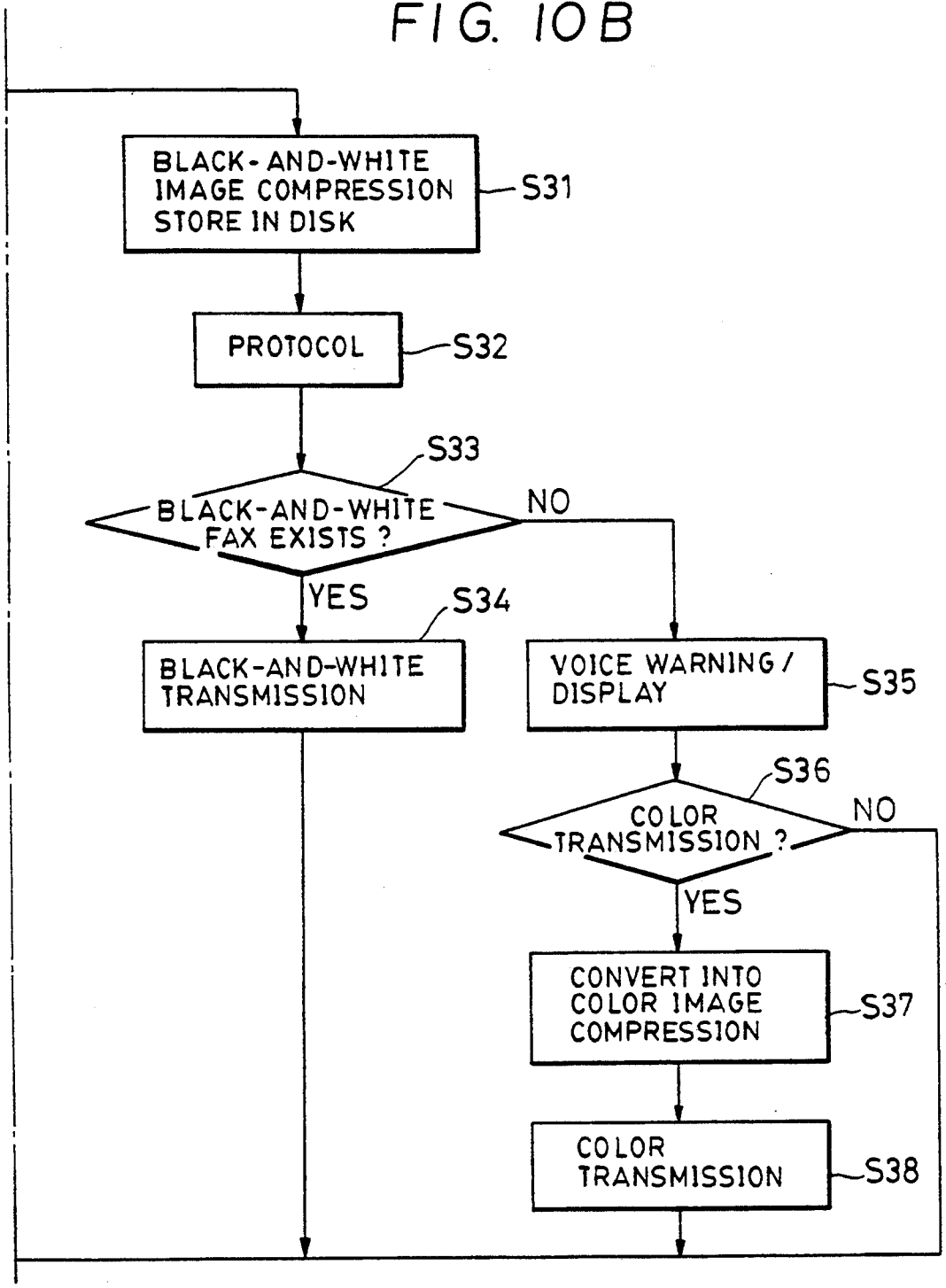

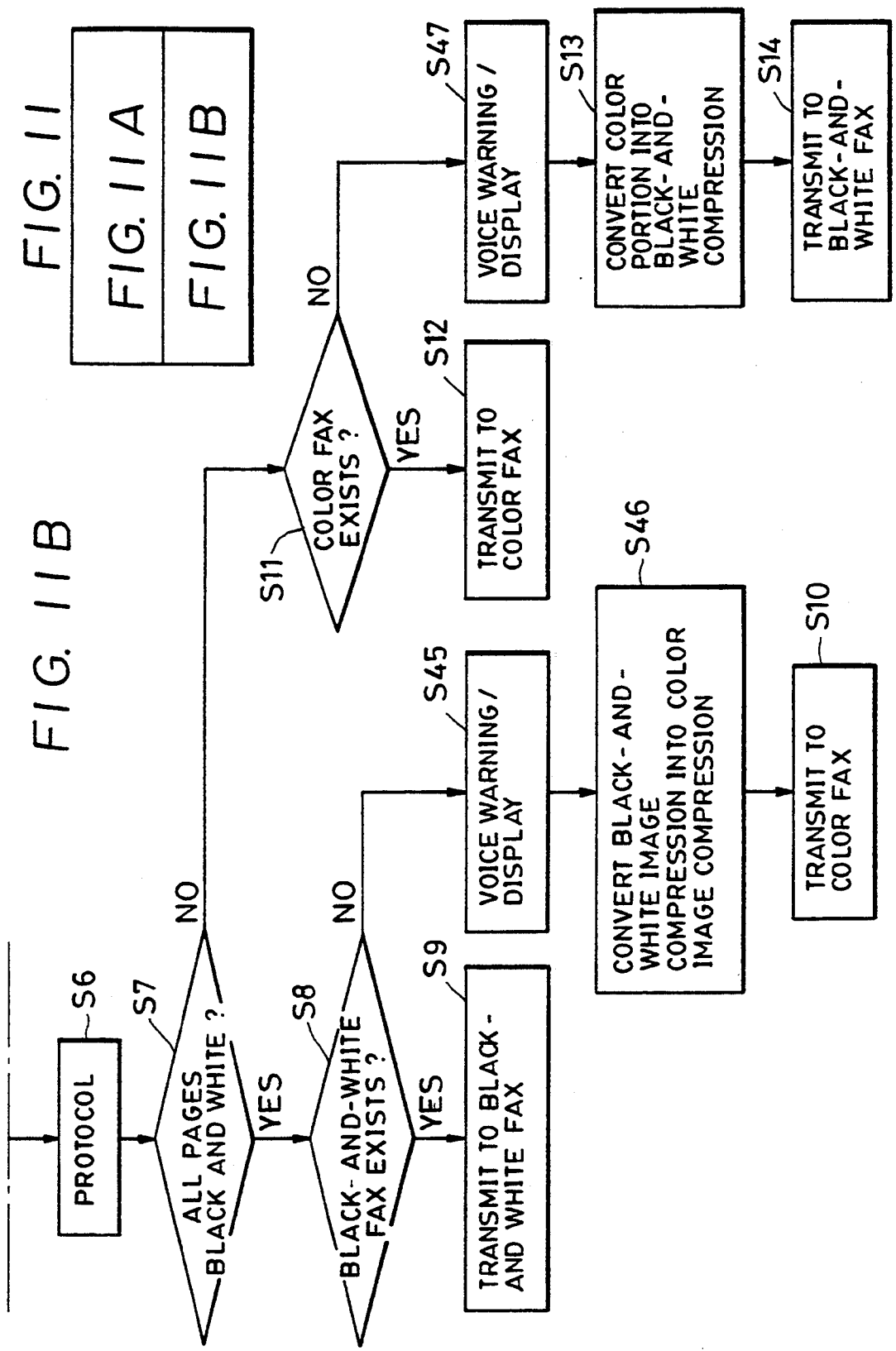

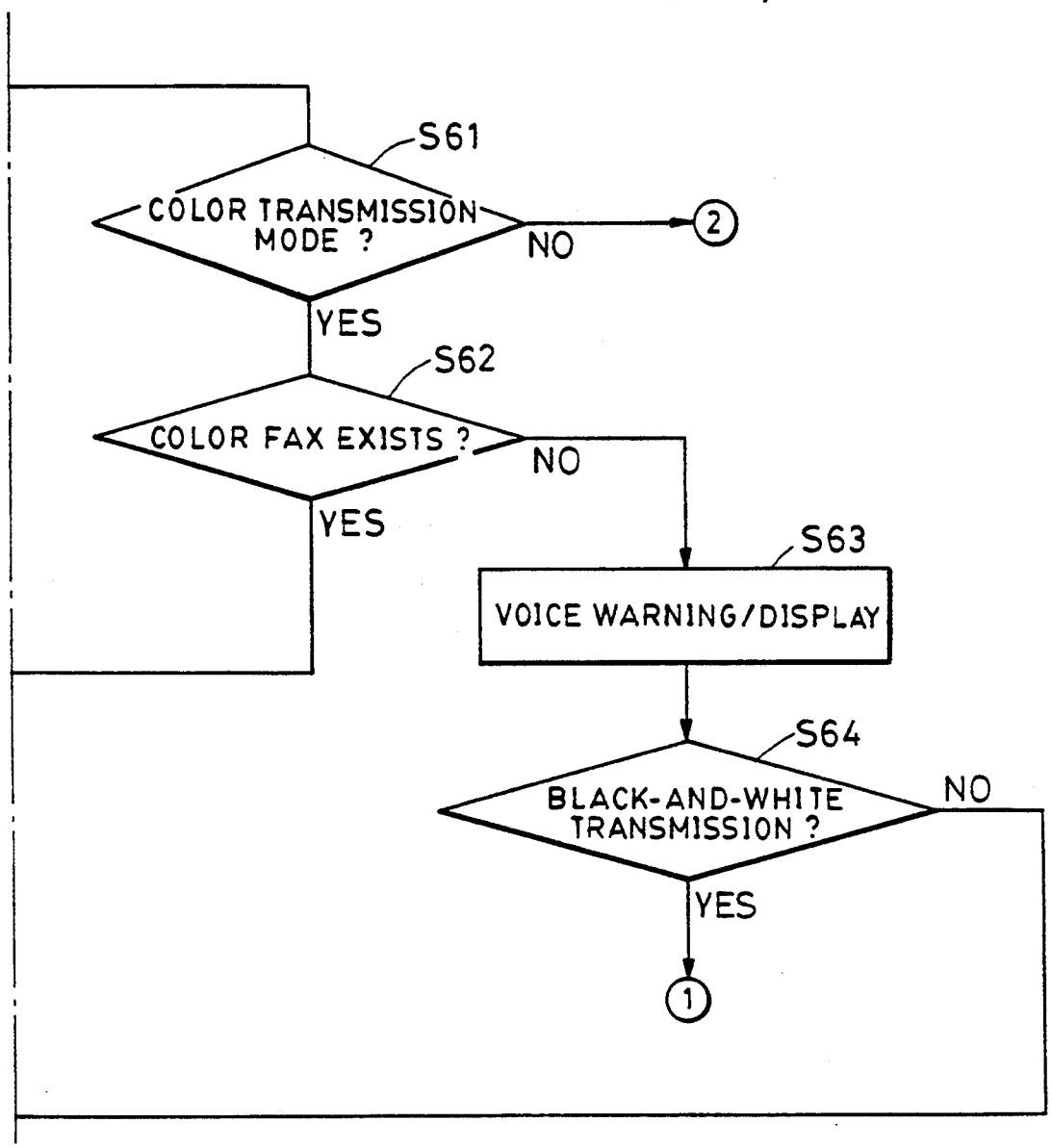

IMAGE PROCESSING APPARATUS AND METHOD

This application is a division of application Ser. No. 07/607,651, filed Oct. 31, 1990, now U.S. Pat. No. 5,220,417.

BACKGROUND OF THE INVENTION

1. Field of the invention

This invention relates to a color image processing apparatus and method having the function of transmitting or receiving a color original.

2. Description of the Related Art

Conventional facsimiles used in facsimile communication, which has long been put into practical use, can transmit and receive only monochromatic (black-and-white) images. Accordingly, a facsimile communication circuit (abbreviated hereinafter a "circuit") network has of course been laid for the purpose of dealing with monochromatic images.

Recently, however, demands for color facsimiles have appeared. Although various kinds of methods are being studied and developed in various fields, the stage has not yet come wherein the methods are normalized and generally utilized, but they are now being internationally investigated. It is relatively easy in principle to configure a color fascimile. However, since almost all facsimiles currently used are for monochromatic images, even if some facsimile stations adopt color facsimiles, the picture quality of reproduced images is substantially deteriorated if most facsimiles installed at parties for transmission (the reception sides) are for monochromatic images, and so mutual communication becomes impossible. As a result, utilization of the current, i.e. monochromatic, circuit becomes impossible if some countermeasures are not taken. Accordingly, development of a method in which color facsimiles can be used while utilizing the current circuit without modification has been strongly demanded.

Techniques for discriminating whether an original has a black-and-white image or a color image are described in U.S. Pat. No. 4,739,397 and U.S. Pat. No. 4,953,013. There is room for improvement, however, in the above-described techniques from the viewpoint of transmission of color originals and black-and-white originals.

SUMMARY OF THE INVENTION

It is an object of the present invention to remove the above-described disadvantages in the prior art.

It is a further object of the present invention to provide a color image processing apparatus capable of efficiently performing transmission and reception of image data.

These objects are accomplished, according to one aspect of the present invention, by an image processing apparatus comprising discrimination means for discriminating a color/black-and-white status of an input original having an image, and selection means for selecting a party for transmitting image data obtained from the input original in accordance with a result of discrimination by the discrimination means.

According to another aspect, the present invention relates to an image processing apparatus comprising discrimination means for discriminating a color/black-and-white status of a predetermined amount of an input original, and compression means for compressing image data obtained from the input original with different compression methods in accordance with a result of discrimination by the discrimination means.

It is a still further object of the present invention to efficiently transmit and receive black-and-white image data and color image data.

This object is accomplished, according to one aspect of the present invention, by an image processing apparatus comprising first output means for outputting data subjected to color image compression, second output means for outputting data subjected to black-and-white image compression, selection means for selecting between the first and second output means in accordance with a kind of an apparatus at a party for transmission, and transmission means for transmitting compressed data from the output means selected by the selection means.

It is still another object of the present invention to provide a transmission apparatus having an excellent operability.

This object is accomplished, according to one aspect of the present invention, by an image processing apparatus comprising first compression means for performing compression for a black-and-white image on input image data, second compression means for performing compression for a color image on input image data, selection means for selecting between the first and second compression means, and setting means for setting a first mode wherein the selection means performs the selection in accordance with a color/black-and-white status of the input image data and a second mode wherein the selection means performs the selection in accordance with a manual key input.

According to another aspect, the present invention relates to an image processing method comprising the steps of performing compression for a black-and-white image for input image data, performing compression for a color image for input image data, selecting between the first and second compression steps, and setting a first mode wherein the selection is performed in accordance with a color/black-and-white status of the input image data at the selection step and a second mode wherein the selection is performed in accordance with a manual key input at the selection step.

It is still a further object of the present invention to efficiently transmit black-and-white images and color images.

These and other objects and aspects of the present invention will become more apparent from the following description made in reference to the accompanying drawings and the appended claims.

DETAILED DESCRIPTION OF THE PREFERRED EMBODIMENTS

The preferred embodiments of the present invention will now be explained with reference to the drawings.

First Embodiment

Figure 1:
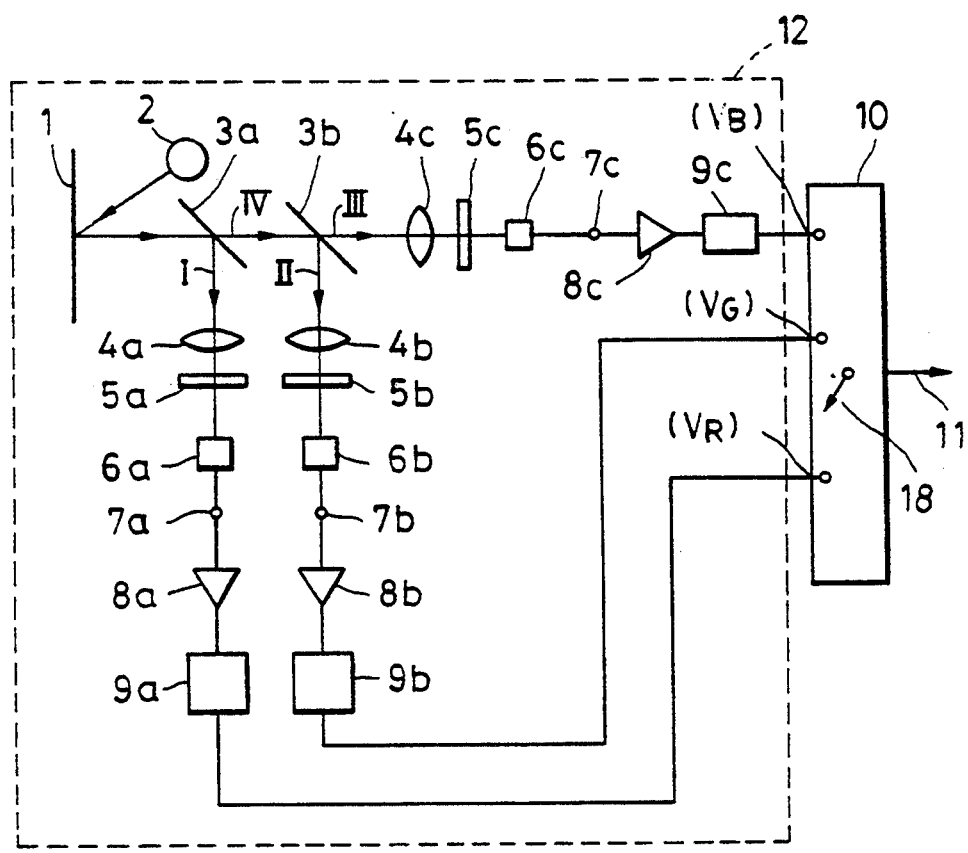
FIG. 1 is a diagram showing a basic color separation apparatus according to a first embodiment of the present invention.

FIG. 1 is a diagram showing a basiccolor separation apparatus installed at the transmission side of a color facsimile. In FIG. 1, there are shown a color original 1, a light source 2 for illuminating the original, half-mirrors 3a and 3b, lenses 4a, 4b and 4c, red (R), green (G) and blue (B) filters 5a, 5b and 5c, sensors for photoelectric conversion, such as CCD line sensors or the like, 6a, 6b and 6c, signal output terminals 7a, 7b and 7c, amplifiers 8a, 8b and 8c, A/D converters 9a, 9b and 9c, a color-signal transmission controller 10, a circuit 11, such as a public circuit or the like, and a color separation photoelectric conversion unit 12.

The original 1 is illuminated by light emitted from the light source 2, and part of light reflected from the original 1 is first branched by the half-mirror 3a in the direction of arrow I. The branched light, including only red component light after passing the red filter 5a, is subjected to photoelectric conversion by the sensor 6a for red color, and is output to terminal 7a as an electrical signal corresponding to red color. A part of the light transmitted through the half-mirror 3a in the direction of arrow IV is branched by the second half-mirror 3b in the direction of arrow II. The branched light, including only green component light after passing the green filter 5b, is subjected to photoelectric conversion by the sensor 6b for green color, and is output to terminal 7b as an electrical signal corresponding to green light. The light proceeding in the direction of arrow III after passing the second half-mirror 3b, and including only blue component light as a result of passing the blue filter 5c, is subjected to photoelectric conversion by the sensor 6c for blue color and is output to terminal 7c as an electrical signal corresponding to blue color.

All the color signal components obtained as a result of the above-described color separation have analog values. Hence, after passing the respective dedicated amplifiers 8a, 8b and 8c, these signals are input to the respective dedicated A/D converters 9a, 9b and 9c, where the signals are subjected to digital processing. In FIG. 1, the digitized signals are indicated by symbols $V_E$, $V_G$ and $V_S$.

Figure 2:
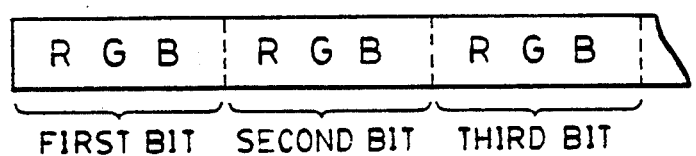
FIG. 2 is a diagram showing a time-serial signal composed of R (red), G (green) and B (blue)

These parallel signals $V_E$, $V_G$ and $V_S$ are input to the color-signal transmission controller 10, where they are converted into a time-serial signal (a serial signal) in the order of first bit, second bit, third bit,—as shown in FIG. 2 by RGB, RGB,—, for example, from a signal for a partial image at the left end on the first lateral line on the original 1 to signals in the right direction utilizing a time-sharing function of a decoder (parallel-serial converter) 18 within the controller 10, and the converted signal is transmitted to the circuit 11.

However, since the fascimiles which have already become wide spread are monochromatic types, there has been the disadvantage that, even if color separation is performed by a method as described above, an image cannot be normally reproduced due to a lack of color identifying capability if a party for transmission has a monochromatic facsimile not having a color reproducing function, and transmission and reception of an image becomes impossible as described above.

It is not impossible to reproduce color by synthesizing fascimile signals. That is, it is easy to synthesize color signals by replacing the signal transmission controller 10 in the transmission system shown in FIG. 1 with a signal reception controller and inverting the transmission channels for respective color signals. The only obstacle is that almost all facsimile stations currently installed have monochromatic facsimiles. As a result, the above-described inconvenience thereby occurs.

Figure 3A:
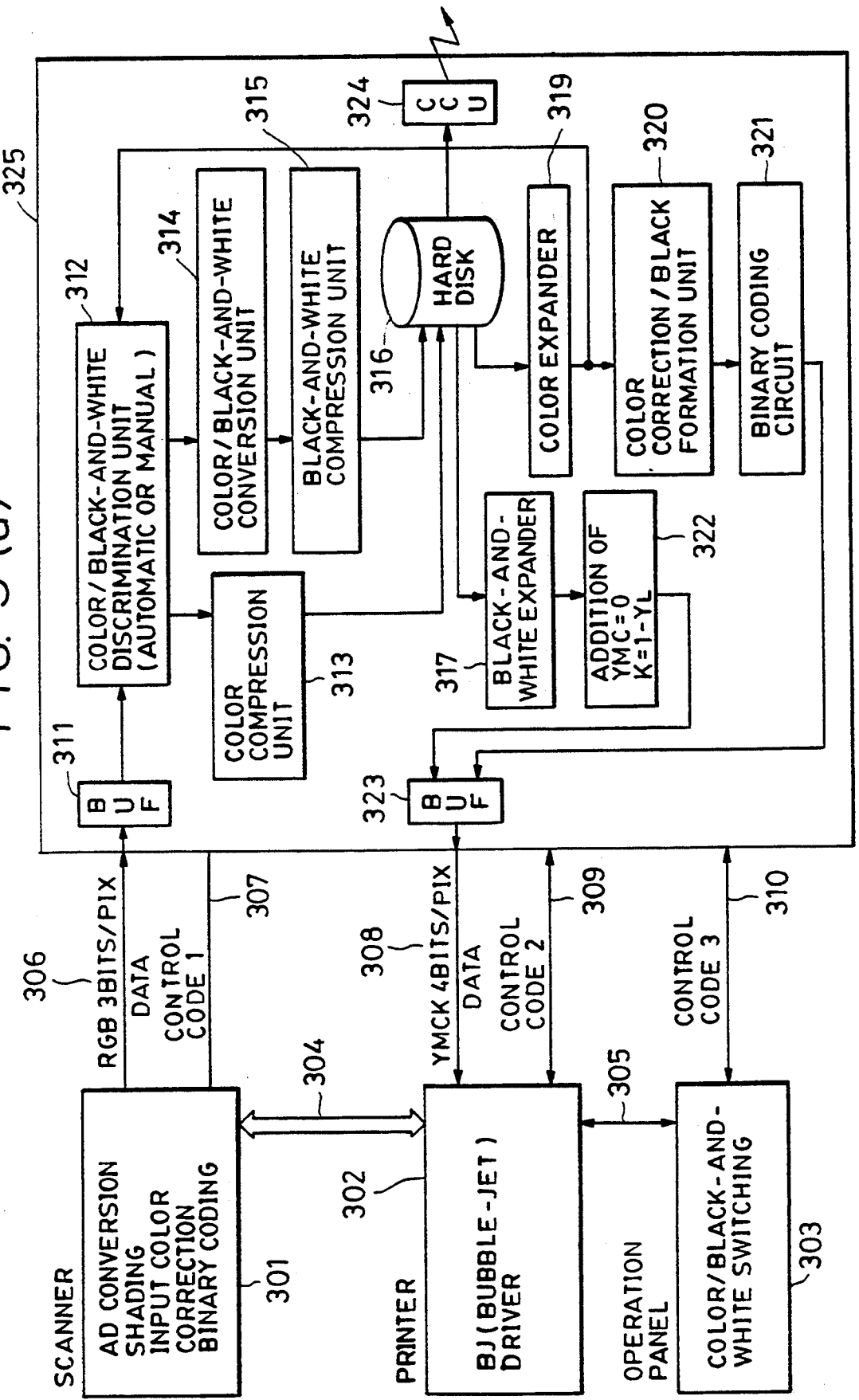
FIG. 3, composed of FIGS. 3(a), 3(b), 3(c) and 3(d), includes block diagrams showing the basic configuration of a color image processing apparatus according to the present invention.

FIG. 3(a) is a block diagram of a color image processing apparatus of the present embodiment.

First, an explanation will be provided of the entire flow in a color facsimile by reference to FIG. 3(a).

In FIG. 3(a), a scanner unit 301 reads an original, and outputs respective one-bit data for R, G and B for one picture element.

FIG. 3(a) shows the configuration of the scanner unit 301. In transmission, an image on an original is converted into electrical signals by photoelectric conversion devices 1301, such as CCD linear sensors or the like, while being subjected to optical color separation in the scanner unit 301, and the converted signals are subjected to analog-to-digital conversion by an A/D converter 1302. Digitized three-color reflective signals from the original pass a shading circuit 1303 for correcting variations in the light source, the photoelectric conversion devices and the like, and are input to an input color correction circuit 1304 for, for example, matching the signals with spectral characteristics of the NTSC system. The signals are then input to a masking circuit 1305, where color correction (masking processing) is performed according to 3×3 matrix conversion or the like. The respective color signals are multivalue data (for example, 24-bit data composed of 8-bit data for each color) up to this point. However, since the current transmission channel has a narrow band, too much transmission time is needed. Hence, it is practical to transmit the signals as binary data with a resolution of 400 dpi (dots per inch). Accordingly, the image data are binary coded by a binary coding circuit 1308, are converted into a serial signal by a parallel-serial converter 1307, and are output from the scanner 301. As a result, the signal output from the scanner 301 is composed of one bit for each of the NTSC signals R, G and B for one picture element, that is, 3 bits/pixel (picture element) in total for three colors.

Output data from the scanner 301 are input to a buffer memory 311 within a controller 325 in FIG. 3(a). The buffer memory 311 is a component, composed of a line memory, for storing data for a few lines. A unit 312 for discriminating whether an original is a black-and-white original or a color original performs switching so that color separation data for an original are input to a color compression unit 313 or to a black-and-white compression unit 315 according either to a result of automatic discrimination between a black-and-white original and a color original, or to manual setting of a color/black-and-white switching button on an operation panel 303. As shown in FIG. 3(b), the color/black-and-white discrimination unit 312 includes a discrimination circuit 201, a selector 202 for selecting whether data from the BUF 311 are input to a color/black-and-white conversion unit 314 (side A) or to the color compression unit 313 (side B) according to a result of discrimination by the discrimination circuit 201, and an operation unit 203 for performing manual setting of color/black-and-white status. The selector 202 selects the side A when the output from the color/black-and-white discrimination circuit 201 is 0 (black-and-white), and selects the side B when the output from the circuit 201 is 1 (color). In the case of manual setting, manual setting using the operation unit 203 is performed in preference to discrimination by the discrimination circuit 201. The side A is selected when setting from the operation unit 203 is $S_1 = 0$ (black-and-white), and the side B is selected when setting is $S_1 = 1$ (color), irrespective of the value $S_0$ in the selector 202. In a service mode, it is possible to set a default mode when power of a power supply is turned on to color or black-and-white by a mode switch.

A unit 314 converts data discriminated as from a black-and-white original as a result of automatic or manual color/black-and-white status discrimination by the unit 312 from a three-color signal into a black-and-white signal.

The color compression unit 313 performs compression of image data including color information using a compression algorithm, such as block coding for performing coding by performing, for example, orthogonal transformation for every block, vector quantization, ADCT (adaptive discrete cosine transform) or the like. The black-and-white compression unit 315 performs data compression by a compression algorithm, such as MH, MR, MMR or the like, used in a conventional black-and-white facsimile.

At this time, when black-and-white data are provided as a result of manual or automatic discrimination, the data can be transmitted if standard compression for a G3 FAX (facsimile) or a G4 FAX has been performed by the black-and-white compression unit 315, even if a party for transmission has a G3 FAX or a G4 FAX. A G4 FAX is for a digital network for ISDN (integrated services digital network), while a G3 FAX is for an analog network Utilizing a telephone circuit. Hence, a modem is needed for a G3 FAX.

Black-and-white data transmitted from a G4 FAX or a G3 FAX are stored in a hard disk 316, and are decoded by a black-and-white expander 317. The data are composed of only black information at this time. Hence, when, for example, an ink-jet printer 302 for simultaneously recording four colors is used, data for yellow (Y), magenta (M) and cyan (C) made 0 for not performing printing ($Y = M = C = 0$) are added, and the resultant data are transmitted to a buffer memory 323. Signal K for black is calculated by $K = 1 - Y_e$. The signal $Y_e$ will be described later. It becomes thereby possible to perform an operation totally identical to that for color recording.

When the transmitted data are color data, the data output from the hard disk 316 are subjected to color expansion by a color expander 319. A color correction/black formation unit 320 then performs color correction and black formation in order to generate from an NTSC signal a signal matched with color materials used in the printer 302. A multivalued output from the color correction/black formation unit 320 is subjected to binary coding by a density-preserving-type binary coding circuit 321, from which 4-color 4 bits/pixel data are input to an output buffer memory BUF 323.

Data from the BUF 323 are output in the form of 4 bits/pixel either in the case of black-and-white data or in the case of color data. The printer 302 is a color printer, which, for example, uses ink-jet recording unit having recording heads of the bubble jet system, and performs simultaneous recording by four heads for Y, M, C and K arranged in parallel. Accordingly, YMCK 4 bits/pixel data 308 from the controller 325 are subjected to foul-color printing while subjected to buffering by a registration unit for the heads. In the case of black-and-white, printing is performed with $Y = M = C = 0$ and in accordance with 0 or 1 of signal K.

The bubble jet system is a system in which a liquid droplet is emitted by boiling a film by a thermal energy.

An outline of the color facsimile of the present embodiment has now been provided. Next, an explanation will be provided of the color/black-and-white automatic disrimination unit which is an essential unit in the present embodiment, and a method for generating a black-and-white image signal from a color image signal.

Figure 4:
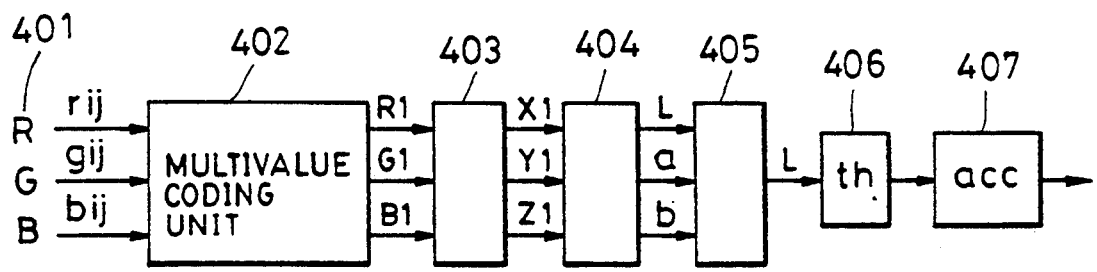
FIG. 4 is a block diagram showing a color/black-and-white original automatic discrimination circuit.

FIG. 4 shows an example of the color/black-and-white automatic discrimination unit. In FIG. 4, it is assumed that binary-coded NTSC 3 bits/pixel signals 401 for R, G and B are input, and the values of data at a certain point (i, j) are represented by r, g and b. If the signals are subjected to multivalue processing with, for example, picture elements $2n+1$ and $2m+1$ by a multi-value coding conversion unit 402, converted signals are expressed by the following expression (1):

$$R1 = 1/(2n + 1)(2m + 1) \sum_{\alpha=-n}^{n} \sum_{\beta=-m}^{m} r_{i+\alpha, j+\beta} \quad (1)$$

$$G1 = 1/(2n + 1)(2m + 1) \sum_{\alpha=-n}^{n} \sum_{\beta=-m}^{m} g_{i+\alpha, j+\beta}$$

$$B1 = 1/(2n + 1)(2m + 1) \sum_{\alpha=-n}^{n} \sum_{\beta=-m}^{m} b_{i+\alpha, j+\beta}.$$

Since the input signals 401 are binary signals having values of 0 or 1, it is difficult to calculate a color for every picture element, and it is not necessary to perform black-and-white/color discrimination for every picture element. What is necessary to determine is what color there is within an average area. If the numbers n and m are too large, there occurs a possibility of misdiscrimination at fine-line portions having color characters or the like. Hence, the value $n = m = 1-10$ is reasonable.

Data subjected to multivalue processing by expression (1) are subjected to conversion between R, G and B in NTSC and X, Y and Z in CIE according to the following expression (2). Using a result obtained by expression (2), lightness L and colors "a" and "b" are calculated according to the following expression (3):

$$\begin{pmatrix} X1 \\ Y1 \\ Z1 \end{pmatrix} = (a_{ij}) \begin{pmatrix} R1 \\ G1 \\ B1 \end{pmatrix}. \quad (2)$$

$$L = 116(Y/Y_0)^{\frac{1}{3}} - 16 \qquad (3)$$

$$a = 500[(X/X_0)^{\frac{1}{3}} - (Y/Y_0)^{\frac{1}{3}}]$$

$$b = 200[(Y/Y_0)^{\frac{1}{3}} - (Z/Z_0)^{\frac{1}{3}}].$$

The color component by the following expression (4):

$$l = \sqrt{a^2 + b^2}. \qquad (4)$$

In FIG. 4, circuits 402, 403, 404 and 405 perform calculations according to expressions (1), (2), (3) and (4), respectively. A circuit 406 determines an achromatic range. The threshold value "th" in the circuit 406 becomes "a" when $1 \leq a$ ($0 < a < 255$) and the circuit 406 determines that the original is an achromatic, that is, a black-and-white original. An accumulator 407 counts the number of picture elements for which "th">"a" for a color in each picture element, and determines that the original is a color original when the number is at least a predetermined number of picture elements, and the original is a black-and-white original when the number is less than the predetermined number. The predetermined number of picture elements is made a reference for the purpose of preventing misdiscrimination due to an error in reading by the scanner 301 or the like.

The above-described discrimination of whether the original is colored or black-and-white is performed for every page of the original. Accordingly, in automatic discrimination, reading is performed first assuming a color original, and data for one page subjected to color compression by the color compression unit 313 are stored in the hard disk 316 while discriminating the data by the discrimination circuit 312. When the count number in the accumulator 407 is small at the end of reading one page and so it is discriminated that the original is black-and-white, the data stored in the disk 36 are input to the color/black-and-white discrimination unit 312 by the color expander 319. Since it has been known that the data flown from the discrimination unit 312 are for black-and-white, the color data are converted into black-and-white data by the color/black-and-white conversion unit 314, and the converted data are written again in the hard disk 316 by the black-and-white compression unit 315. The color data which were previously input are deleted after black-and-white conversion of the data subjected to feedback. Hence, the data are stored in the hard disk 316 in a minimum capacity.

Figure 5:
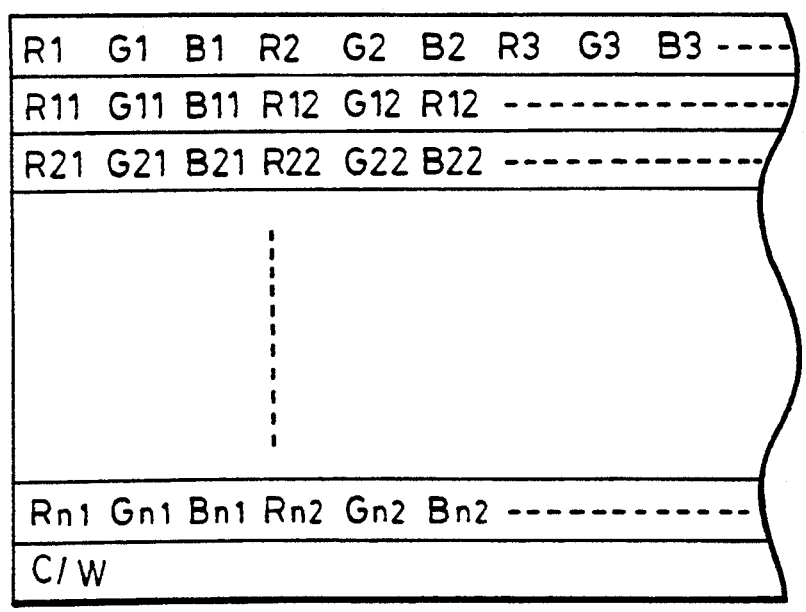
FIG. 5 is a diagram showing how black-and-white binary data are produced from color binary data.

FIG. 5 is a diagram for explaining a method for obtaining black-and-white binary data from color binary data. Black-and-white data are produced using, for example, a set of (R1, G1, B1), where R, G and B are binary data output from the scanner 301. When the corresponding image is manually set to a black-and-white mode using the operation panel 203 (303 in FIG. 3(a)), or it is discriminated as a black-and-white original by the color/black-and-white automatic discrimination unit 312, a black-and-white signal is produced according to the following expression (5):

$$Y_1 = 0.299R + 0.587G + 0.114B \qquad (5).$$

Signals R, G and B, being binary data, are 0 or 1. Calculation using expression (5) is performed while performing conversion 0→0 and 1→255. It is assumed that black-and-white binary coded data K is K=0 (a dot is not printed) if $Y_1 \leq 128$, and K=1 (a dot is printed) if $Y_1 < 128$.

Expression (5) is for the case of signals subjected to color separation from NTSC signals. When other signals are input, black-and-white signals may also be obtained using a similar basic concept, though coefficients have different values.

As described above, according to the present embodiment, by manually or automatically setting the black-and-white/color status of an original, and by using a compression method for a black-and-white image for a black-and-white original, and using a compression method for a color image for a color original, compression effeciency can be greatly increased in the case of a black-and-white original.

Furthermore, by providing the color/black-and-white conversion unit 314, it is possible to use a compression algorithm for black-and-white information even when chromatic picture elements exist in a part of an original. Moreover, it becomes possible to communicate with existing facsimiles in formats G3, G4 and the like.

In addition, since the system is arranged so that manual discrimination may also be performed as well as automatic discrimination, it is possible to perform transmission and reception using a compression algorithm for black-and-white information if the user wants to transmit and receive a color original in a short time, or when it is not necessary to transmit an image in color.

Second Embodiment

The basic configuration of a second embodiment is identical to that shown in FIG. 3.

In the present embodiment, in place of the conversion from R, G and B signals in NTSC into signals L, "a" and "b" used in color/black-and-white discrimination in the first embodiment, conversion into signals H, L and S is used.

Figures 6, 7:
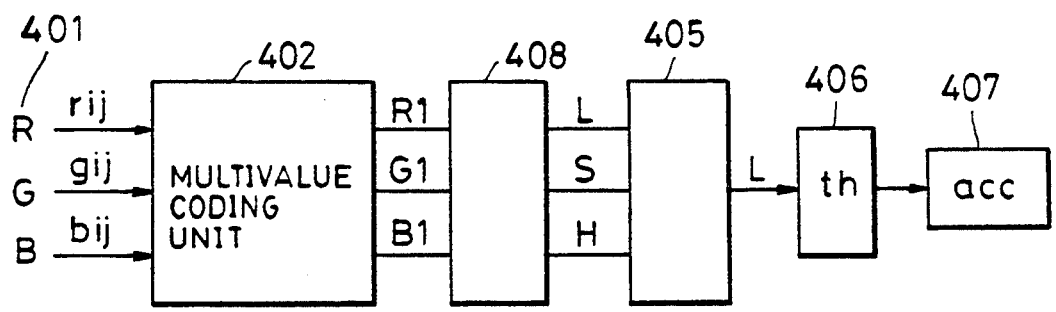
FIG. 6 is a block diagram showing another color/black-and-white original automatic discrimination circuit.
FIG. 7 is a diagram showing expressions for transforming signals R, G and B into signals L, S and H.

That is, the present embodiment differs from the first embodiment in that a HLS conversion unit 408 as shown in FIG. 6 is provided in place of the circuits 403 and 404 for the conversion into L, "a" and "b".

Expression for conversion from signals R, G and B into signals H, L and S is shown in FIG. 7. The color component is provided by the following expression (6):

$$l = \sqrt{H^2 + S^2}. \qquad (6)$$

A method for determining an achromatic range from the value l is the same as that in the first embodiment.

Conversion from signals R, G and B is not limited to the above-described signals L, "a" and "b", and signals H, L and S, but an identical discrimination operation may be performed using parameters separated into a lightness signal and hue signals and capable of discriminating between chromatic/achromatic properties for every picture element, such as signals L, u and v, signals Y, I and Q, or the like. Even if parameter conversion is not performed, color/black-and-white discrimination may be performed, for example, according to the distribution of chromatic and achromatic colors in Max (R, G, B)−Min (R, G, B) space.

Third Embodiment

Figure 8:
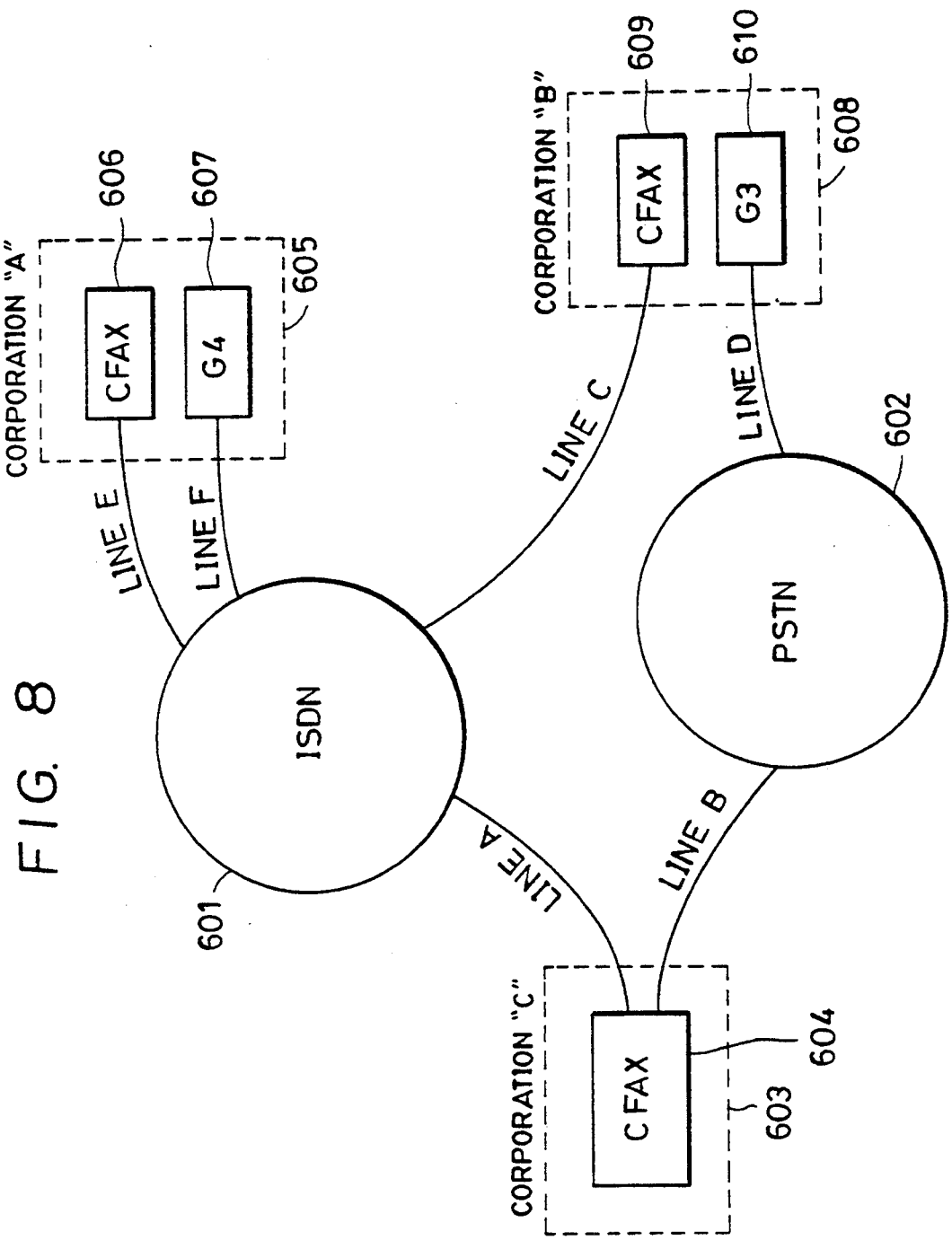
FIG. 8 is a diagram showing a network using a color image processing apparatus according to the present invention.

FIG. 8 shows an example of utilization of color facsimiles having the color/black-and-white automatic discrimination units in the first embodiment. In FIG. 8, there are shown ISDN (a digital communication network) 601, PSTN (a public telephone circuit) 602, and a color facsimile (CFAX) 604 having a color/black-and-white automatic discrimination unit used in corporation "C" 603. In corporation "A" 605, a color facsimile (CFAX) 606 is connected to the ISDN through line F, and a G4 black-and-white facsimile 607 is also connected to the ISDN through line E. In corporation "B", a color facsimile (CFAX) 609 is connected to the ISDN through line C, and a G3 black-and-white facsimile 610 is connected to the PSTN through line D.

When both color and black-and-white originals are transmitted from corporation "C" 603 to corporation "A" 605, the CFAX 604 can transmit image data to the CFAX 606 on line E via the ISDN through line A using its color/black-and-white automatic or manual discrimination unit 312 in the case of a color original. In the case of a black-and-white original, transmission is automatically switched to the G4 black-and-white FAX 607, and high-quality black-and-white image data can be transmitted at high speed. Similarly, image data can be transmitted to the separate facsimiles in corporation "B" by performing color/black-and-white discrimination.

The CFAXs 604, 606 and 609 used in the present embodiment are image processing apparatuses explained in the first embodiment. Lines E and F connected to the CFAX 606 and the G4FAX 607 in corporation "A", respectively, and lines C and D connected to the CFAX 609 and the G3FAX 610 in corporation "B", respectively, are registered whether they are for color FAXs or black-and-white FAXs according to their addresses, and the system is arranged so that the CFAX 604 in corporation "C" at the transmission side can select the registration.

When the discrimination unit 312 discriminates that the original has a color image, image data are transmitted to the CFAX 606 or the CFAX 609. When the discrimination unit 312 discriminates that the original has a black-and-white image, image data are transmitted to the G4FAX 607 or the G3FAX 610.

When corporation "A" or "B" at the reception side has only a color facsimile, data are transmitted to the color facsimile. When only a black-and-white facsimile is owned, data are transmitted while performing compression for black-and-white information by the black-and-white compression unit 315 even if the original is discriminated as a color original. Thus, it becomes possible to transmit data for color originals to a color facsimile, and data for black-and-white originals to a facsimile dedicated for black-and-white images, even if color originals and black-and-white originals are mixed. Hence, the present embodiment provides very significant effects from the viewpoint of communication speed, image discrimination, cost and the like.

In the ISDN or the like, since it is possible to assign a plurality of subaddresses for one circuit, black-and-white and color facsimiles may be installed in the subaddresses. In this case, according to the present embodiment, in consideration of the current status that very few color facsimiles have been used, the system is arranged so as to be able to also communicate with G4 and G3 machines. That is, if a black-and-white original is mixed among color originals, a black-and-white signal is automatically produced, data are compressed in a black-and-white mode to increase compression efficiency, and recording is performed using only black ink in reception. It is thereby possible to provide better definition in fine-line portions, such as character portions or the like, than in recording of black by superposing three colors, and to provide higher picture quality in transmission of black-and-white originals. For that purpose, a color/black-and-white automatic discrimination unit is provided, and a black-and-white setting switch is provided on an operation panel in order to set a black-and-white mode. A luminance signal is thereby obtained from three-color data, and black-and-white data are obtained by binary coding the luminance signal. Thus, it is possible to realize communication with conventional facsimiles which are not color facsimiles.

Fourth Embodiment

Although the basic configuration of an image processing apparatus of a fourth embodiment is identical to that of the first embodiment, a method of color/black-and-white discrimination is different in the present embodiment.

That is, in the first embodiment, color/black-and-white discrimination is performed for every page of an original. In such a discrimination method, however, if data are transmitted while selection is performed between a color printer and a black-and-white printer at the reception side according to a result of automatic (or manual) discrimination for an original, as in the third embodiment, when color pages and black-and-white pages are mixed in an original composed of several pages, one original is dispersed in a plurality of printers. Hence, there occurs inconvenience particularly when a black-and-white printer and a color printer are separately installed. In the present embodiment, such a problem is solved by performing color/black-and-white discrimination for every original.

The configuration of the present embodiment will be explained by reference to FIG. 3.

In FIG. 3, the color/black-and-white discrimination unit 312 discriminates color/black-and-white of an original for every page as in the third embodiment. Data of a page discriminated as having a color image are compressed using an algorithm for color image compression by the color compression unit 313, and the compressed data are stored in the hard disk 316. On the other hand, data of a page discriminated as having a black-and-white image pass through the color/black-and-white conversion unit 314, are compressed using an algorithm for black-and-white image compression by the black-and-white compression unit 315, and the compressed data are stored in the hard disk 316.

In the present embodiment, as shown in FIG. 3(c), a counter 204 for counting outputs having a value 1 (that is, pages discriminated as having color images) among output signals from the color/black-and-white discrimination circuit 201 is provided. When discrimination for a plurality of pages has been performed, the entire original is transmitted to a color facsimile (the CFAX 606 or the CFAX 609 in FIG. 8) except when the count value is 0, and color output is performed. According to the present embodiment, when an original is composed of a plurality of pages, color/black-and-white discrimination is performed not for every page, but for every original. Hence, even an original composed of both black-and-white and color pages can be transmitted in a unit to a single reception apparatus. Furthermore, since compression for a black-and-white image is performed for black-and-white pages at that time, communication time can be shortened, and cost can be reduced.

Fifth Embodiment

Although, in the foregoing third embodiment, the kinds of facsimiles at the reception side are previously registered as addresses at the transmission side, and a party for transmission is selected in accordance with the color/black-and-white status of an original, the kind of facsimile at the reception side may be confirmed in a procedure before starting communication, and a facsimile at the transmission side may be selected in accordance with the confirmed result, as in the present embodiment.

The present embodiment will now be explained by reference to the flowchart shown in FIG. 9.

An original is read for an amount of one page by the color separation apparatus 12 (S1), and the color/black-and-white status of the original is then discriminated by the color/black-and-white discrimination unit 312 (S2). When the original has been discriminated as a color original, color image compression is performed by the color compression unit 313 (S3). When the original has been discriminated as a black-and-white original, black-and-white compression is performed by the black-and-white compression unit 318 (S4). In either case, compressed data are stored in the hard disk 316.

If the original is composed of a plurality of pages, the above-described processing is repeated for all pages (S5), and the process proceeds to protocol with the reception side when the processing has ended (S6).

If all pages of the original are black-and-white (S7), and there is a black-and-white facsimile at the reception side (S8), data are transmitted to the black-and-white facsimile (for example, the G4FAX 605 or the G3FAX 610 in FIG. 8) (S9). If all pages of the original are black-and-white (S7), but the reception side has only a color facsimile (S8), black-and-white image data are transmitted to the color facsimile (S10). In this case, since the color facsimile at the reception side has both the color expander 319 and the black-and-white expander 317, as shown in FIG. 3(a), the color facsimile can reproduce a black-and-white image even if compressed data of the black-and-white image are received.

If at least one page of the original has been discriminated as colored (S7), and there is a color facsimile (for example, the CFAX 606 or 609 in FIG. 8) at the reception side (S11), data are transmitted to the color facsimile (S12). If there is no color facsimile at the reception side, data subjected to color image compression among image data stored in the hard disk 316 are expanded by the color expander 319, are then converted into black-and-white image data by the color/black-and-white conversion unit 314. The converted data are subjected to black-and-white image compression by the black-and-white compression unit 315, and the resultant data are stored again in the hard disk 316. The color data are thus switched to black-and-white compression (S13), and are transmitted to a black-and-white facsimile (S14).

According to the present embodiment, after black-and-white/color discriminaton for an original, the transmission side performs transmission after discriminating by a protocol whether an apparatus at the reception side is a facsimile capable of receiving color data or a facsimile for black-and-white data. Hence, an appropriate selection may be performed even if it has not previously been known which type of apparatus the reception side has.

Furthermore, since both the color/black-and-white status of an original and the color/black-and-white status of an apparatus at the reception side are considered, efficiency can be further increased than when control is performed according to discrimination for either one of the above-described two items.

Sixth Embodiment

FIG. 10 shows a flowchart of a sixth embodiment of the present invention.

In the present embodiment, a black-and-white transmission mode and a color transmission mode are manually selected using a mode switch on the operation panel 303, and processing is performed in accordance with the kind of facsimile at the reception side.

First, either one of the black-and-white transmission mode and the color transmission mode is manually set using the operation unit 203 on the operation panel 303 (S21). In the color transmission mode, color image compression is performed irrespective of black-and-white/-color of an original, and the compressed data are stored in the disk (S22 and S23). Protocol is then executed (S24). If there is a color facsimile at the reception side, the contents of the disk are transmitted to the color facsimile without modification (S25 and S26). If there is no color facsimile at the reception side, a voice warning is performed by a warning means (not shown), and the fact is also displayed on a liquid-crystal display on the operation panel 303 (S27). If a command to perform black-and-white transmission is issued through the operation panel 303 (S28), image data subjected to color image compression are converted into data subjected to black-and-white image compression (S29), and black-and-white transmission is performed (S30). If black-and-white transmission is not performed, the process is terminated.

When the transmission mode is a black-and-white transmission mode, black-and-white image compression is performed, the compressed data are stored in the disk (S31), and protocol is executed (S32). If there is a black-and-white facsimile (including a color facsimile having a function of receiving black-and-white compression data) at the reception side, black-and-white transmission is performed (S33 and S34). If there is no black-and-white facsimile, the voice warning and display are performed as described above (S35). When color transmission is performed, data are converted into data subjected to color image compression (S37), and color transmission is performed (S38). When color transmission is not performed, the process is terminated (S36).

According to the present embodiment, by performing warning and display when communication intended by the operator cannot be performed when a manual mode is set, it is possible to confirm an image to be output at the reception side, and so improve operability.

Seventh Embodiment

Figure 11A:
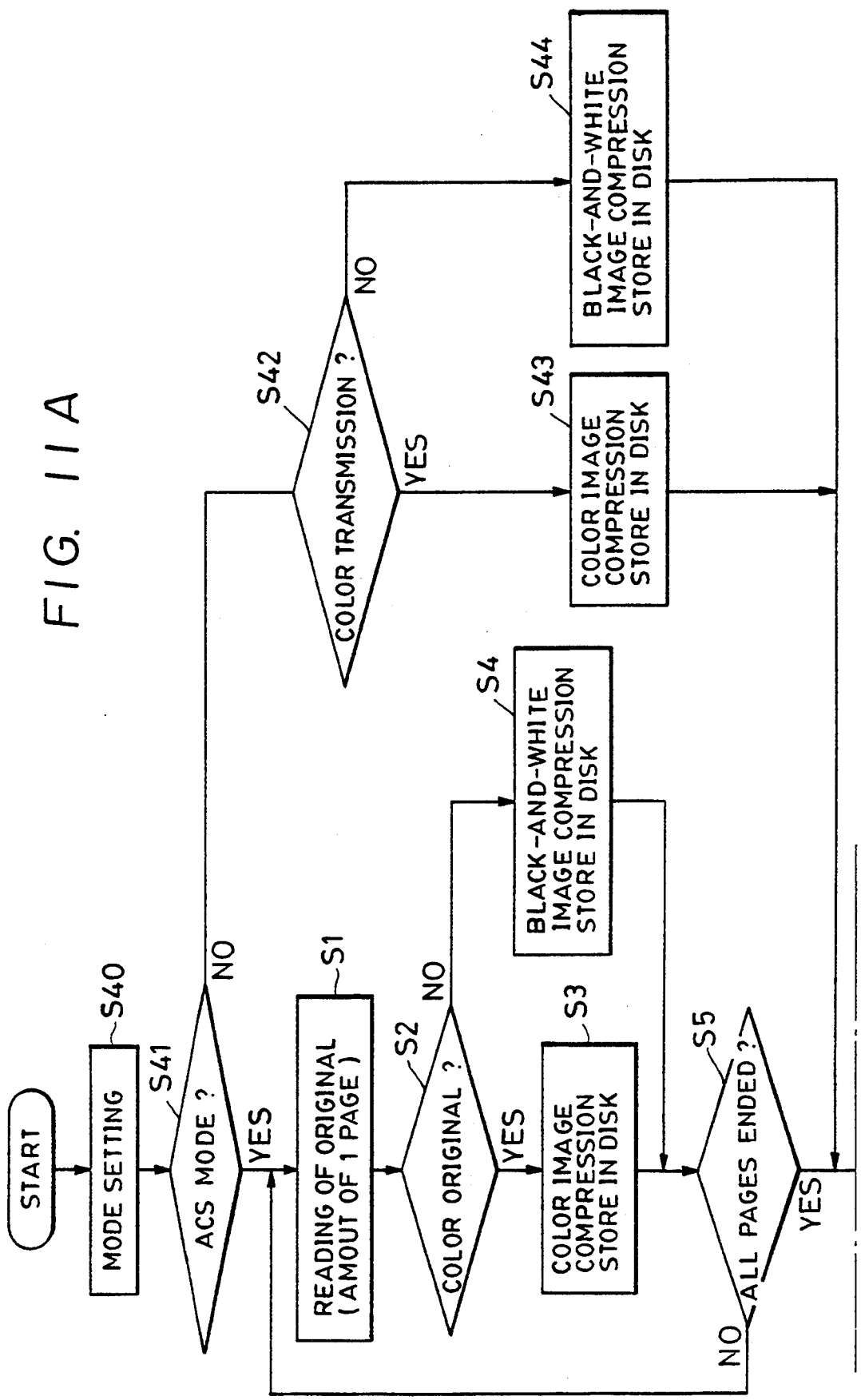

FIG. 11 shows a flowchart of a seventh embodiment of the present invention.

In the present embodiment, an auto color selection mode (ACS mode) for automatically discriminating the black-and-white/color status of an original, a color transmissin mode and a black-and-white transmission mode are manually selected using a mode switch on the operation panel 303.

Figure 9:
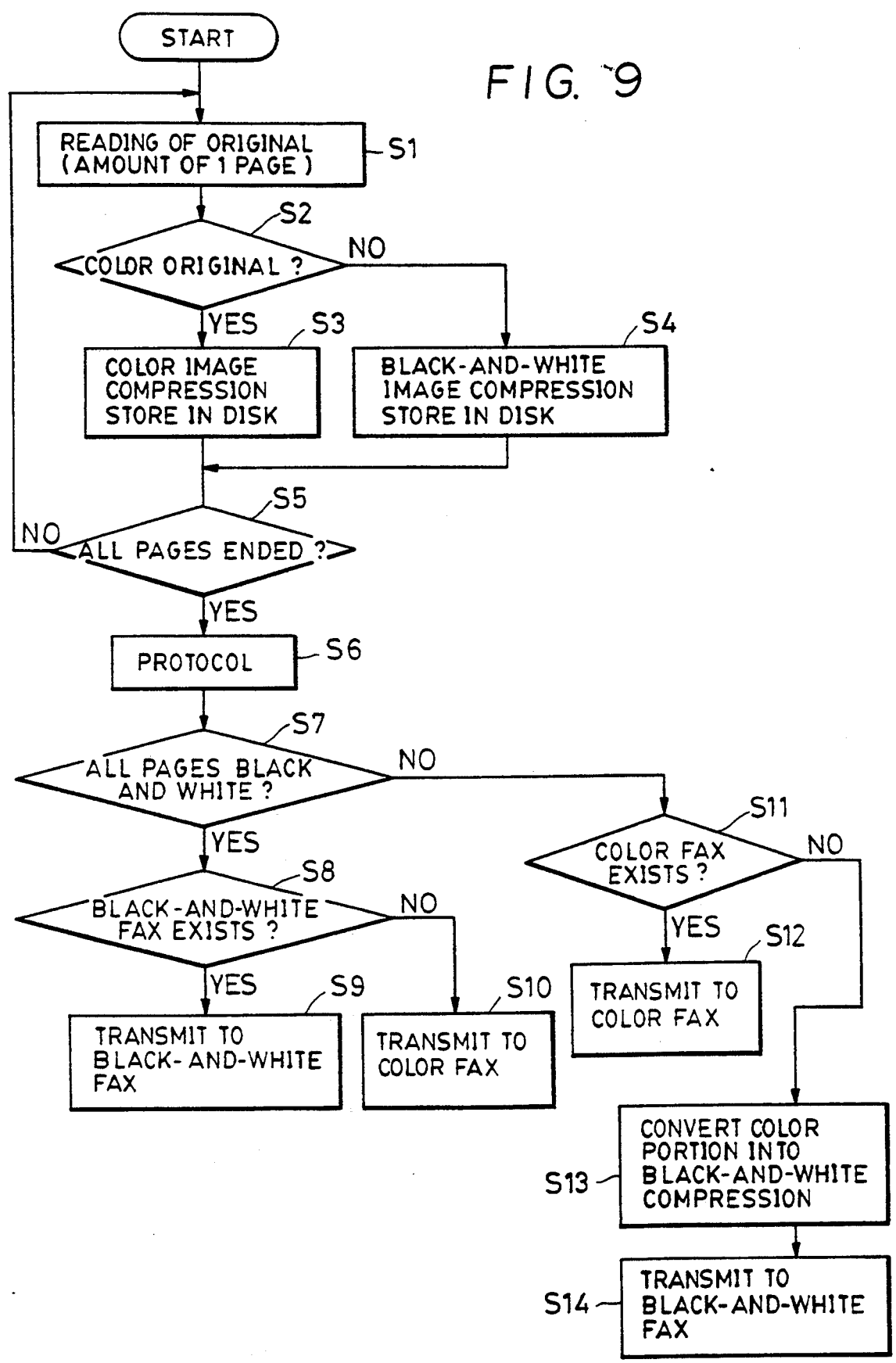
FIG. 9 is a flowchart illustrating communication performed using a color image processing apparatus according to the present invention.

An explanation will now be provided mainly of steps different from those shown in FIG. 9.

First, mode setting is performed using a mode switch on the operation panel 303 (S40). In the case of the ACS mode, the same processings as those in FIG. 9 (steps S1–S5) are performed (S41). If the color mode has been selected, all pages are subjected to color image compression, and the compressed data are stored in the disk (S43). In the case of the black-and-white transmission mode, black-and-white image compression is performed, and the compressed data are stored in the disk (S44).

The subsequent processings are nearly identical to those shown in FIG. 9, except that the voice warning and display as shown in FIG. 10 are performed (S45 and S47), and data subjected to black-and-white image compression are converted into data subjected to color image compression in the case of a color facsimile incapable of receiving data subjected to black-and-white compression (S46).

In the present embodiment, since a mode for automatically discriminating the black-and-white/color status of an original and a mode for manually assigning black-and-white transmission and color transmission, efficiency in processing is increased when, for example, a color original is transmitted in black-and-white.

Eighth Emodiment

Figure 12:
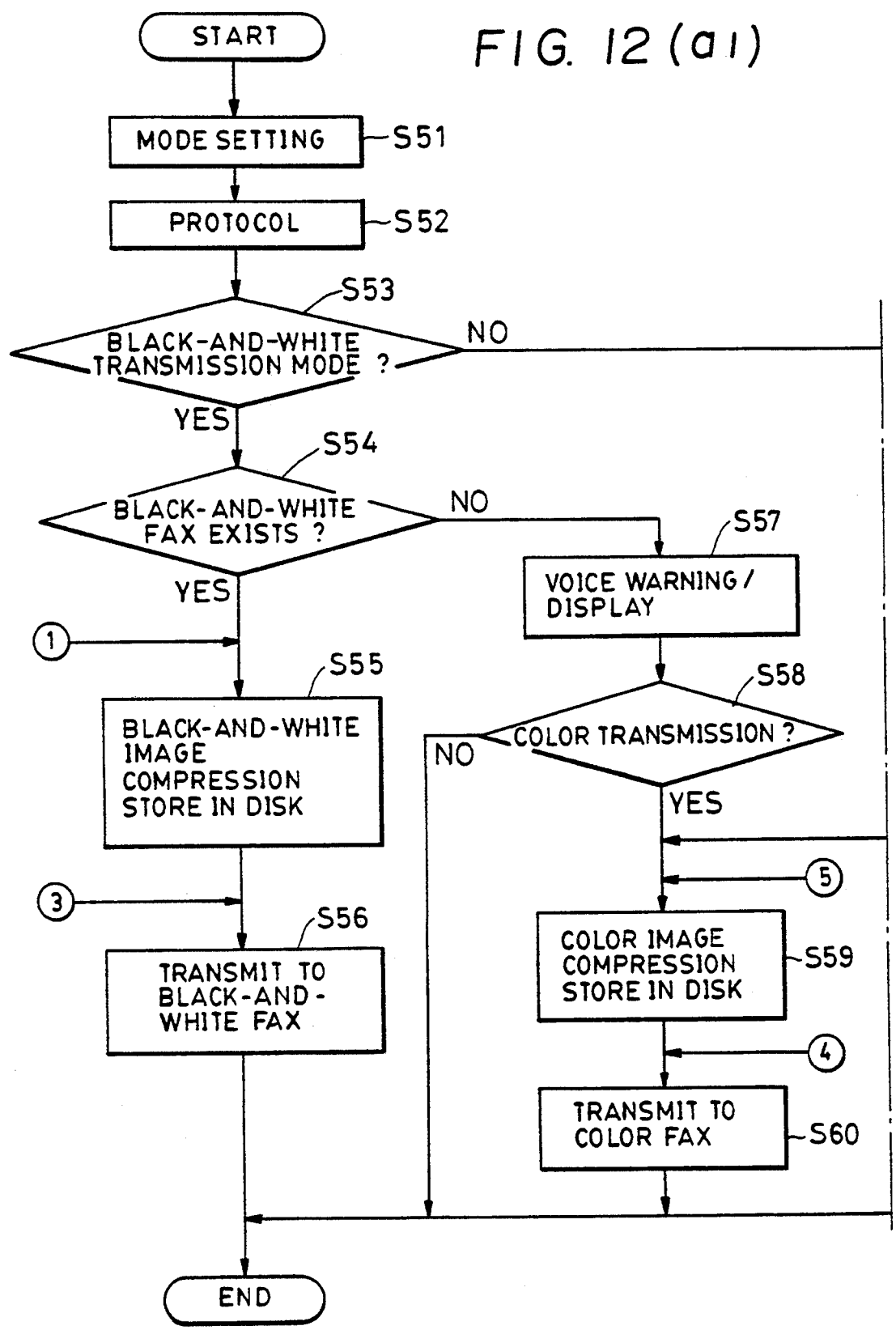

FIG. 12 shows an eighth embodiment of the present invention.

In the present embodiment, a protocol is executed before image compression, and conversion of compressed data becomes unnecessary.

Mode setting (S51) is the same as in the case of FIG. 11. Next, the protocol is executed (S52), and confirms whether a facsimile at the reception side is a black-and-white facsimile or a color facsimile. If the black-and-white transmission mode has been set and the reception side has a black-and-white facsimile (S53 and S54), black-and-white image compression is performed (S55), and the compressed data are transmitted to the black-and-white facsimile (S56). If the reception side has a color facsimile incapable of receiving data subjected to black-and-white compression, the voice warning and display are performed as described above (S57). When color transmission is performed, color image compression is performed, the compressed data are stored in the disk (S59), and the data are transmitted to the color facsimile (S60). When color transmission is not performed, the process is terminated (S58).

If the color transmission mode has been set (S61) and the reception side has a color facsimile, the above-described steps S59 and S60 are performed (S62). If the reception side does not have a color facsimile, the voice warning and display are performed (S63), and the operator is asked whether or not black-and-white transmission is to be performed. When black-and-white transmission is performed, the above-described steps S55 and S56 are performed. When black-and-white transmission is not performed, the process is terminated.

As shown in FIG. 12(b), when the ACS mode has been set, if the reception side has a color facsimile, black-and-white/color discrimination for the original at steps S1–S5 shown in FIG. 9 is performed. If all pages of the original are black-and-white and a color facsimile at the reception side can receive black-and-white data (S66 and S68), data are transmitted to the color facsimile (S60). If at least one color page is included in the original, or if a color facsimile at the reception side cannot receive black-and-white data while all pages of the original are black and white, the black-and-white pages are converted into color compression (S67), and the data are transmitted to the color facsimile (S60).

Figure 12C:
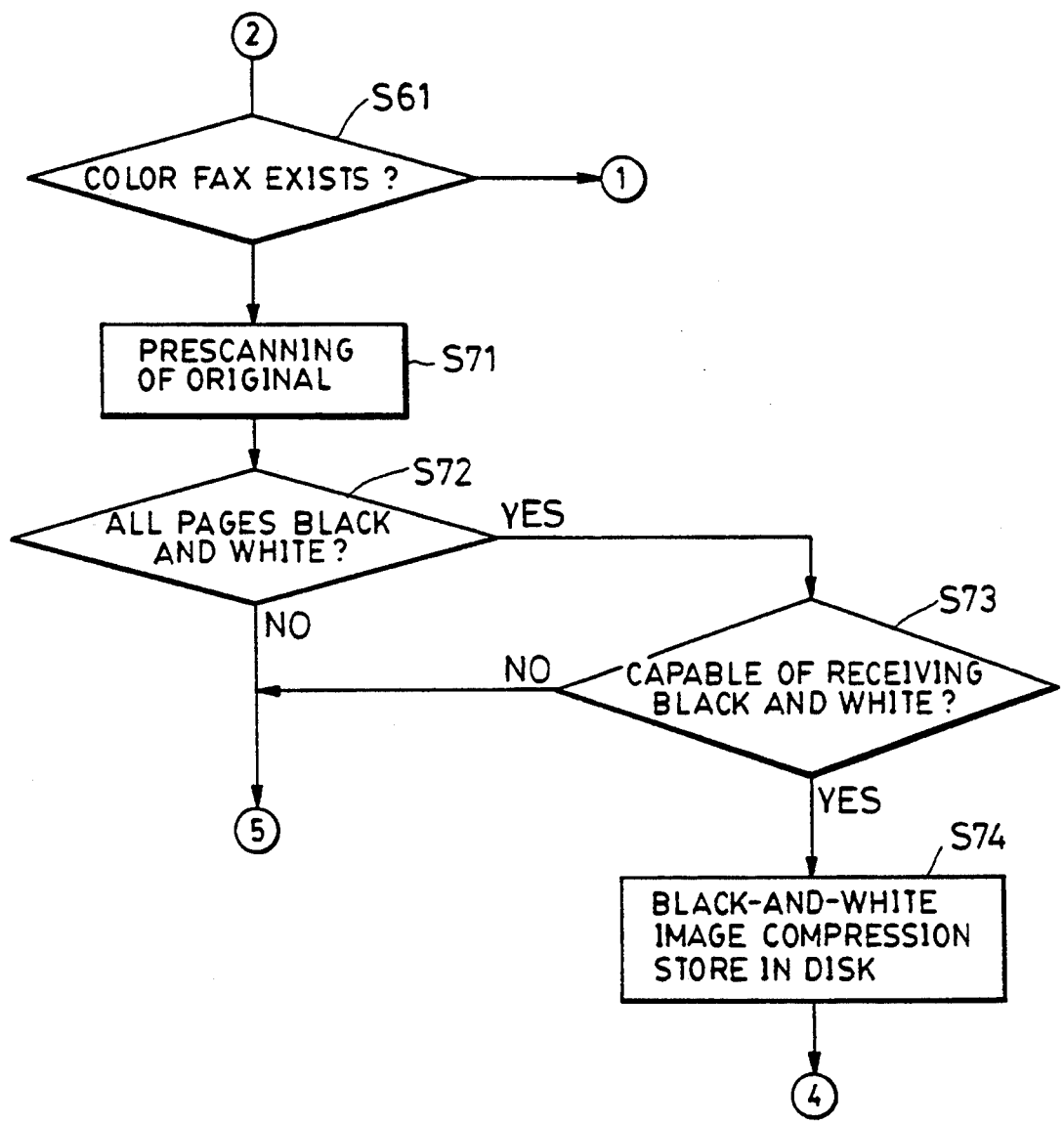
Figure 12:
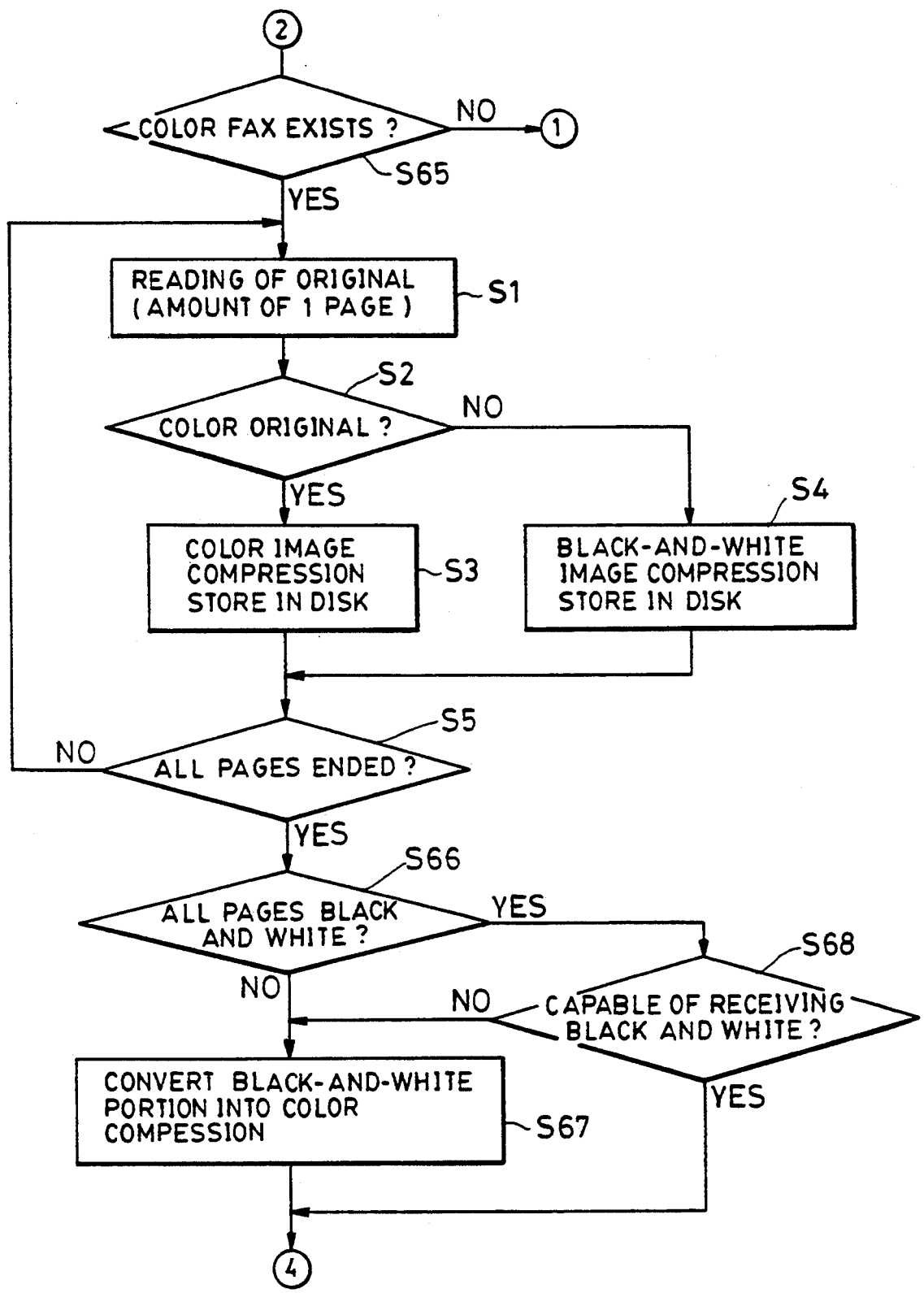

In place of the flow shown in FIG. 12 (b), prescanning may be performed in order to discriminate black-and-white/color of the original, as shown in FIG. 12(c).

That is, if the reception side has a color facsimile at step S61, all pages of the original are subjected to prescanning (S71). If all pages are black and white, and the reception side can receive data subjected to black-and-white compression (S72 and S73), black-and-white image compression is performed, the compressed data are stored in the disk (S74), and the data are transmitted to the color facsimile (S60). If at least one color page is included in the original, or if the reception side cannot receive data subjected to black-and-white compression, the process shifts to steps S59 and S60.

According to the present embodiment, since priority is given to discrimination for the kind of an apparatus at the reception side, the necessity to change compression processing is reduced, and so efficient processing can be performed.

The above-described control including protocol is performed by a CPU within the controller 325. The control unit including the CPU comprises a ROM storing programs for control, a RAM and the like.

Although, in the foregoing embodiments, input signals are signals R, G and B, input signals may be a combination of other color-component signals, such as Y (yellow), M (magenta) and C (cyan), or the like.

Input signals are not necessarily those as a result of direct reading of an image of an original by a CCD scanner, but may also be outputs from a host computer, outputs from a filing system using magnetic disks, outputs from a still-picture video camera or a video camera, or the like.

Although, in the foregoing embodiments, a BJ (bubble-jet) printer having a head wherein a liquid droplet is ejected by ebullition of a thin film caused by heat energy, as mentioned in U.S. Pat. No. 4,723,129 and U.S. Pat. No. 4,740,793, is used as the printer, any printer capable of forming a color image may also be used, such as a color dot printer, a color ink-jet printer, a color laser-beam printer, a thermal color printer, or the like.

Although an explanation has been provided for the case of binary data, the same principle may also be used in the case of transmission and reception of multivalue data. When performing transmission and reception of multivalue data, the binary coding unit in the scanner 301 and the multivalue coding unit 402 in the color/black-and-white discrimination unit 312 become unnecessary.

Black-and-white/color discrimination is not necessarily performed for every page. That is, the discrimination may be performed for at least a predetermined number of pages in a unit. The determination may also be performed for every half page. Color portions and black-and-white portions in a page become more easily separated as a unit for discrimination is smaller, and hence it is possible to adopt compression methods suited for the respective portions.

As described above, according to the present invention, it is possible to increase efficiency in transmission and reception of color image data.

The present invention is not limited to the above-described embodiments, but various changes and modifications may be made within the scope of the appended claims.

What is claimed is:

1. An image processing apparatus comprising:
   a) input means for inputting image data;
   b) first compression means for subjecting the image data by said input means to color image compression;
   c) second compression means for subjecting the image data input by said input means to black-and-white image compression;
   d) selection means for manually selecting between said first and second compression means regardless of whether the image data input by said input means represents a color image or a black-and-white image; and
   e) transmission means for transmitting compressed data from said first or second compression means selected by said selection means,
   wherein said input means comprises a plurality of photoelectric conversion means, each of which generates a different color component signal.

2. An apparatus according to claim 1, further comprising, conversion means for converting the image data input by said input means into black-and-white image data.

3. An apparatus according to claim 1, further comprising, memory means for storing the image data compressed by said first or second compression means.

4. An apparatus according to claim 1, wherein said transmission means transmits the image data compressed by said first or second compression means via a digital network.

5. An apparatus according to claim 1, wherein the apparatus includes image forming means for forming an image on a medium.

6. An apparatus according to claim 5, wherein said image forming means is a bubble-jet printer.

7. An image processing apparatus comprising:
   a) input means for inputting image data;
   b) first compression means for subjecting the image data input by said input means to color image compression;
   c) second compression means for subjecting the image data input by said input means to black-and-white image compression;
   d) selection means for manually selecting between said first and second compression means regardless of whether the image data input by said input means represents a color image or a black-and-white image;
   e) transmission means for transmitting compressed data from said first or second compression means selected by said selection means; and
   f) conversion means for converting the image data input by said input means into black-and-white image data.

8. An apparatus according to claim 7, further comprising, memory means for storing the image data compressed by said first or second compression means.

9. An apparatus according to claim 7, wherein said transmission means transmits the image data compressed by said first or second compression means via a digital network.

10. An apparatus according to claim 7, wherein the apparatus includes image forming means for forming an image on a medium.

11. An apparatus according to claim 10, wherein said image forming means is a bubble-jet printer.

12. An image processing apparatus comprising:
    a) input means for inputting image data;
    b) first compression means for subjecting the image data input by said input means to color image compression;
    c) second compression means for subjecting the image data input by said input means to black-and-white image compression;
    d) selection means for manually selecting between said first and second compression means regardless of whether the image data input by said input means represents a color image or a black-and-white image;
    e) transmission means for transmitting compressed data from said first or second compression means selected by said selection means; and
    f) memory means for storing the image data compressed by said first or second compression means.

13. An apparatus according to claim 12, wherein said transmission means transmits the image data compressed by said first or second compression means via a digital network.

14. An apparatus according to claim 12, wherein the apparatus includes image forming means for forming an image on a medium.

15. An apparatus according to claim 14, wherein said image forming means is a bubble-jet printer.

16. An image processing apparatus comprising:
    a) input means for inputting image data;
    b) first compression means for subjecting the image data input by said input means to color image compression;
    c) second compression means for subjecting the image data input by said input means to black-and-white image compression;
    d) selection means for manually selecting between said first and second compression means regardless of whether the image data input by said input means represents a color image or a black-and-white image; and
    e) transmission means for transmitting compressed data from said first or second compression means selected by said selection means,
    wherein said transmission means transmits the image data compressed by said first or second compression means via a digital network.

17. An apparatus according to claim 16, wherein the apparatus includes image forming means for forming an image on a medium.

18. An apparatus according to claim 17, wherein said image forming means is a bubble-jet printer.

19. An image processing method comprising steps of:
    a) input step of inputting image data;
    b) first compression step of subjecting the image data input in said input step to color image compression;
    c) second compression step for subjecting the image data input in said input step to black-and-white image compression;
    d) selection step for manually selecting compressed image data compressed in said first or second compression step regardless of whether the image data input in said input step represents a color image or a black-and-white image; and
    e) transmission step for transmitting compressed data compressed in said first or second compression steps selected by said selection step, wherein in said input step, the image data is input by input means which comprises a plurality of photoelectric conversion means, each of which generates a different color component signal.

20. A method according to claim 19, further comprising, conversion step for converting the image data input by said input step into black-and-white image data.

21. An apparatus according to claim 19, further comprising, storing step of storing the image data compressed in said first or second compression step.

22. An apparatus according to claim 19, wherein in said transmission step, the image data compressed in said first or second compression step is transmitted via a digital network.

23. An image processing method comprising steps of:
a) input step of inputting image data;
b) first compression means of subjecting the image data input in said input step to color image compression;
c) second compression step for subjecting the image data input in said input step to black-and-white image compression;
d) selection step for manually selecting compressed image data compressed in said first or second compression step regardless of whether the image data input in said input step represents a color image or a black-and-white image;
e) transmission step for transmitting compressed data compressed in said first or second compression steps selected by said selection step; and
f) conversion step for converting the image data input by said input step into black-and-white image data.

24. An apparatus according to claim 23, further comprising, storing step of storing the image data compressed in said first or second compression step.

25. An apparatus according to claim 23, wherein in said transmission step, the image data compressed in said first or second compression step is transmitted via a digital network.

26. An image processing method comprising steps of:
a) input step of inputting image data;
b) first compression step of subjecting the image data input in said input step to color image compression;
c) second compression step for subjecting the image data input in said input step to black-and-white image compression;
d) selection step for manually selecting compressed image data compressed in said first or second compression step regardless of whether the image data input in said input step represents a color image or a black-and-white image;
e) transmission step for transmitting compressed data compressed in said first or second compression steps selected by said selection step; and
f) storing step of storing the image data compressed in said first or second compression step.

27. An apparatus according to claim 26, wherein in said transmission step, the image data compressed in said first or second compression step is transmitted via a digital network.

28. An image processing method comprising steps of:
a) input step of inputting image data;
b) first compression step of subjecting the image data input in said input step to color image compression;
c) second compression step for subjecting the image data input in said input step to black-and-white image compression;
d) selection step for manually selecting compressed image data compressed in said first or second compression step regardless of whether the image data input in said input step represents a color image or a black-and-white image; and
e) transmission step for transmitting compressed data compressed in said first or second compression steps selected by said selection step,
wherein in said transmission step, the image data compressed in said first or second compression step is transmitted via a digital network.

* * * * *

UNITED STATES PATENT AND TRADEMARK OFFICE
CERTIFICATE OF CORRECTION

PATENT NO. : 5,361,144
DATED : November 1, 1994
INVENTOR(S) : SUSUMU SUGIURA

Page 1 of 3

It is certified that error appears in the above-identified patent and that said Letters Patent is hereby corrected as shown below:

SHEET 10 OF 17

Figure 10A:
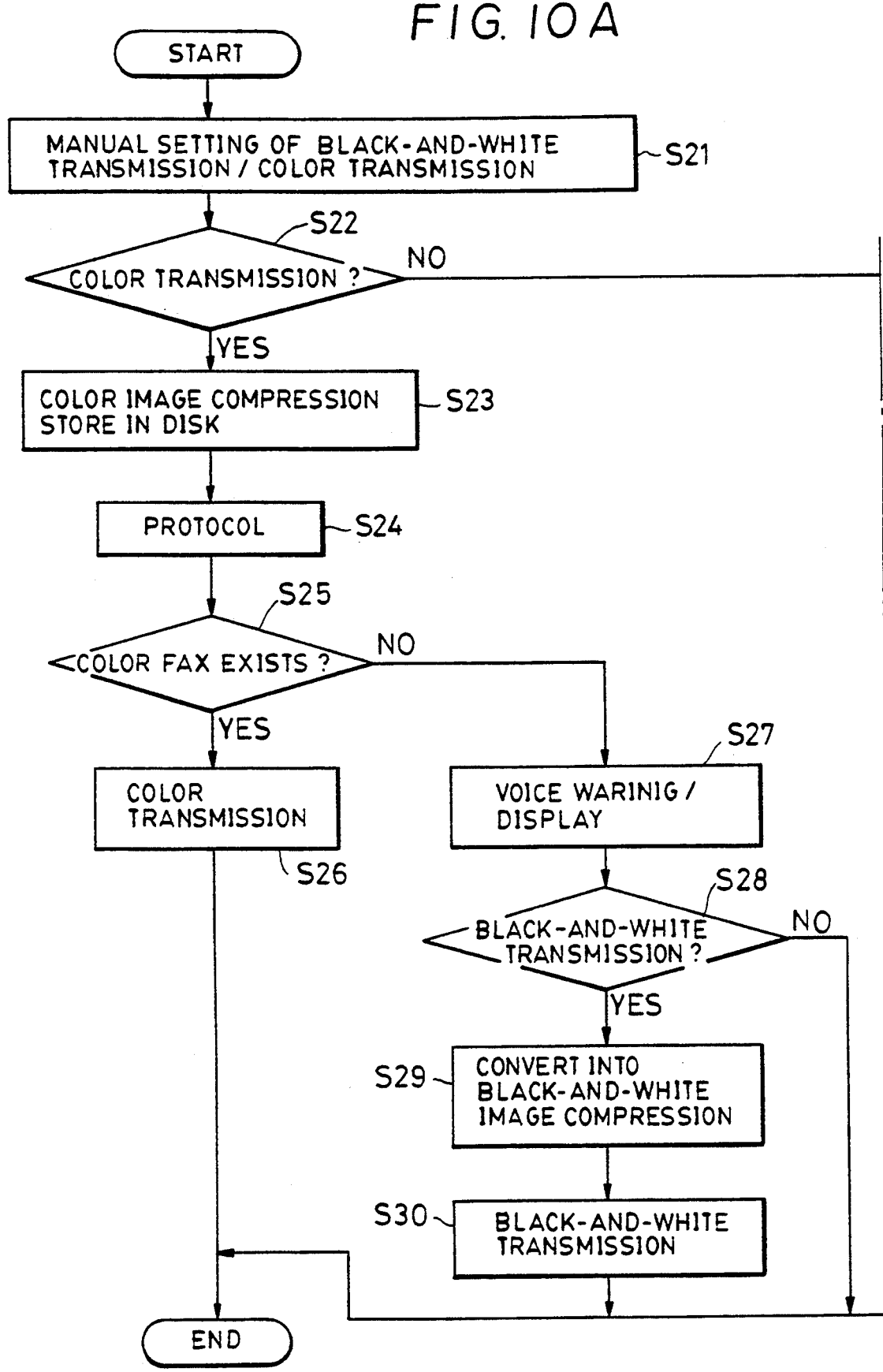
FIGS. 10, 11, 12(a), composed of FIGS. 10(A) and 10(B), 11(A) and 11(B), 12(a1) and 12(a2), respectively, 12(b) and 12(c) are flowcharts showing another embodiments of the present invention.

FIG. 10A, "WARINIG/" should read --WARNING/--.

SHEET 17 OF 17

FIG. 12(b), "COMPESSION" should read --COMPRESSION--.

COLUMN 1

Line 10, "invention" should read --Invention--.

COLUMN 3

Line 14, "another" should read --other--.
Line 63, "$V_E$," should read --$V_R$,-- and "$V_s$." should read --$V_B$.--.
Line 64, "$V_E$," should read --$V_R$,-- and "$V_s$" should read --$V_B$--.

COLUMN 4

Line 55, "circuit 1308," should read --circuit 1306,--.

COLUMN 5

Line 50, "Utilizing" should read --utilizing--.

UNITED STATES PATENT AND TRADEMARK OFFICE
CERTIFICATE OF CORRECTION

PATENT NO. : 5,361,144
DATED : November 1, 1994
INVENTOR(S) : SUSUMU SUGIURA

Page 2 of 3

It is certified that error appears in the above-identified patent and that said Letters Patent is hereby corrected as shown below:

COLUMN 7

Line 7, "component" should read --component is given--.

COLUMN 8

Line 1, "$Y_1 \leq 128$," should read --$Y_1 \geq 128$,--.

COLUMN 11

Line 27, "unit 318" should read --unit 315--.

COLUMN 12

Line 66, "transmissin" should read --transmission--.

COLUMN 15

Line 7, "by" should read --input by--.

UNITED STATES PATENT AND TRADEMARK OFFICE
CERTIFICATE OF CORRECTION

PATENT NO. : 5,361,144
DATED : November 1, 1994
INVENTOR(S) : SUSUMU SUGIURA

It is certified that error appears in the above-identified patent and that said Letters Patent is hereby corrected as shown below:

COLUMN 17

Line 17, "means" should read --step--.

Signed and Sealed this

Second Day of May, 1995

Attest:

BRUCE LEHMAN

Attesting Officer

Commissioner of Patents and Trademarks